United States Patent
Sellars (10) Patent No.: US 11,235,901 B2
(45) Date of Patent: Feb. 1, 2022

(54) METHOD OF DIE CUTTING A LABEL

(71) Applicant: Lux Global Label Company, LLC, Lafayette Hill, PA (US)

(72) Inventor: Neil Sellars, Cinnaminson, NJ (US)

(73) Assignee: Lux Global Label Company, LLC, Lafayette Hill, PA (US)

( * ) Notice: Subject to any disclaimer, the term of this patent is extended or adjusted under 35 U.S.C. 154(b) by 5 days.

(21) Appl. No.: 16/571,895

(22) Filed: Sep. 16, 2019

(65) Prior Publication Data

US 2021/0078750 A1    Mar. 18, 2021

(51) Int. Cl.
| B65C 9/00 | (2006.01) |
|---|---|
| B65C 9/38 | (2006.01) |
| B32B 38/00 | (2006.01) |
| B65C 9/40 | (2006.01) |

(52) U.S. Cl.
CPC .............. *B65C 9/0015* (2013.01); *B65C 9/38* (2013.01); *B65C 9/40* (2013.01); *B32B 38/0004* (2013.01); *B65C 2009/0018* (2013.01); *Y10T 156/1062* (2015.01)

(58) Field of Classification Search
CPC ....... B65C 9/38; B32B 37/08; B32B 38/0004; B26D 1/365; Y10T 156/1062; G09F 2003/0267
USPC ....................................... 156/152
See application file for complete search history.

(56) References Cited

U.S. PATENT DOCUMENTS

| 5,695,579 A * | 12/1997 | Rowland ............ B32B 37/08 |
| | | 156/64 |
| 5,719,828 A | 2/1998 | Haas et al. |
| 8,588,830 B2 | 11/2013 | Myer et al. |
| 9,174,353 B2 * | 11/2015 | Green ..................... B26F 1/44 |
| 2004/0061324 A1 | 4/2004 | Howard |
| 2005/0168340 A1 | 8/2005 | Mosher, Jr. et al. |
| 2007/0051816 A1 | 3/2007 | Chu |
| 2007/0237356 A1 | 10/2007 | Dwinell et al. |
| 2010/0039792 A1 | 2/2010 | Meyers et al. |
| 2011/0115631 A1 | 5/2011 | Droesler et al. |
| 2011/0123198 A1 | 5/2011 | Nilsson et al. |
| 2012/0211569 A1 | 8/2012 | Krawczewicz et al. |
| 2015/0302349 A1 | 10/2015 | Atkinson |
| 2016/0055451 A1 | 2/2016 | Waters et al. |
| 2017/0053290 A1 | 2/2017 | Atkinson et al. |
| 2017/0229000 A1 | 8/2017 | Law |
| 2017/0293968 A1 | 10/2017 | Russell et al. |
| 2017/0300925 A1 | 10/2017 | Atkinson |

(Continued)

OTHER PUBLICATIONS

Non-Final Office Action received for U.S. Appl. No. 16/421,965 dated Oct. 3, 2019, 12 pages.

(Continued)

*Primary Examiner* — Mark A Osele
*Assistant Examiner* — Christopher C Caillouet
(74) *Attorney, Agent, or Firm* — Amin, Turocy & Watson, LLP (57) ABSTRACT

A die cutting method that cuts patterns in a label is provided. According an embodiment, a method adjusts temperature of a label sheet comprising a laminated layer and a liner layer. The method further separates the laminated layer from the liner layer prior to making the cuts on the laminated layer. The method further cuts one or more patterns on the laminated layer. The method further re-attaches, the laminated layer to the liner layer.

7 Claims, 8 Drawing Sheets

(56) References Cited

U.S. PATENT DOCUMENTS

2018/0124871 A1\*  5/2018  Barfuss .................... H05B 3/03
2018/0315360 A1   11/2018  Levine et al.
2019/0042820 A1    2/2019  Brooks et al.
2019/0138864 A1    5/2019  Reyland et al.

OTHER PUBLICATIONS

Non-Final Office Action received for U.S. Appl. No. 16/421,970 dated Sep. 5, 2019, 12 pages.
Non-Final Office Action received for U.S. Appl. No. 16/421,924 dated Feb. 5, 2019, 20 pages.
Non-Final Office Action received for U.S. Appl. No. 16/421,945 dated Feb. 26, 2020, 24 pages.
Non-Final Office Action received for U.S. Appl. No. 16/421,956 dated Apr. 13, 2020, 20 pages.
Final Office Action received for U.S. Appl. No. 16/421,965 dated Mar. 27, 2020, 16 pages.
Final Office Action received for U.S. Appl. No. 16/421,970 dated Jan. 30, 2020, 16 pages.

\* cited by examiner

METHOD OF DIE CUTTING A LABEL

TECHNICAL FIELD

The subject disclosure relates generally to a label, more particularly, to a die cutting a label having a thin liner.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate illumination of the backlit label.

According to an embodiment, a computer-implemented method can comprise adjusting, by a system, temperature of a label sheet comprising a laminated layer and a liner layer. The method can further comprise separating, by the system, the laminated layer from the liner layer. The method can further comprise cutting, by the system, one or more patterns on the laminated layer. The method can further comprise re-attaching, by the system, the laminated layer to the liner layer.

According to another embodiment, a system can comprise a memory that stores computer executable components. The computer executable components can further comprise processor that executes the computer executable components stored in the memory, wherein the computer executable components comprise: a controller component that adjusts a label sheet comprising a laminated layer and a liner layer, wherein the laminated layer comprises a printed face stock layer attached to an adhesive layer; and a die cutting component that separates the laminated layer from the liner layer, wherein the die cutting component further cuts the one or more patterns on the printed face stock layer of the laminated layer and reattaches the laminated layer to the liner layer after cutting the one or more patterns.

According to another embodiment, a method can comprise adjusting temperature of a label sheet comprising a laminated layer and a liner layer. The method can further comprise separating the laminated layer from the liner layer, wherein the laminated layer comprises a printed face stock layer and an adhesive layer. The method can further comprise cutting one or more patterns on the printed face stock layer. The method can further comprise re-attaching the laminated layer having the one or more patterns to the liner layer.

DETAILED DESCRIPTION

The following detailed description is merely illustrative and is not intended to limit embodiments and/or applications or uses of embodiments. Furthermore, there is no intention to be bound by any expressed or implied information presented in the preceding Summary section, or in the Detailed Description section.

There is a high demand for reducing size in making pressure sensitive labels. The standard approach is to reduce square inches and caliper (i.e., using a thin film/liner). Companies using pressure sensitive labels work with manufactures to reduce square inches of labels, make labels that can be efficiently applied, and labels that perform well. However, using a thin liner can be complex. Once companies get a roll of labels, they need to convert the labels to their desired art or specifications by using a die cutting process. With current die cutting technology, it is difficult to reduce the size of thin film/liner beyond 0.9 mm and still achieve application and performance efficiencies. It is especially difficult for liners below 0.5 mm.

When a label is constructed with 0.5 mm liner, there is a reduction in the total amount of labels needed for the roll. Over time, using less labels provides great savings in label manufacturing costs. There are several additional benefits of using a thin liner, such as, for example, reducing downtime by customers and making the entire process more efficient. Also, using less material is great for our environment due to the reduction in emissions and energy used in making the labels. However, with the current technology, problems occur during die cutting using a thin liner. Even with most advanced presses available nowadays, die cutting using thin liner causes stretching.

Given the aforementioned issues with using liners below 0.5 mm, one or more embodiments can be implemented to allow for die cutting liners sized 0.5 mm or below.

In an embodiment, a die cutting system is designed to be integrated on any standard printing and converting press. It would augment and/or replace the current die cutting system available. In some instances, the press itself may need to "opened up" to accommodate this new die cutting system. The new die cutting system die cuts all thin gauge pressure sensitive materials without 1) die cutting too deep, 2) stretching the liner and 3) winding the roll to tight.

In an embodiment, a die cutting process is used to die cut liners coated with pressure sensitive material (e.g., lamination) having a thinness below 0.5 mm. In some embodiments, the system removes the pressure sensitive material from the liner. In an embodiment, a continuous belt is used to separate the lamination portion from the liner. Once the liner is separated (e.g., delaminated), the die cutting process is applied to the liner. In an embodiment, a die cut is applied against a standard surface, instead of a liner itself. Once the die cutting process is applied, the label is re-laminated. In an embodiment, a continuous belt is used to separate lamination from the liner. For instance, pressure sensitive material can anchor to a belt and can easily separate the pressure sensitive material. At this point, die cutting against a surface can be implemented. Finally, pressure sensitive material can be re-laminated prior to application by the customer.

In some embodiment, a modular die cutting module specifically designed to die cut against the surface may be used and can be part of a printing press. The die cutting module is modularly coupled to a die cutting unit of a printing press. The printing press delaminates pressure sensitive materials and re-laminates it back after die cutting is performed using the modular die cutting module. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

Figures 1A, 1B:
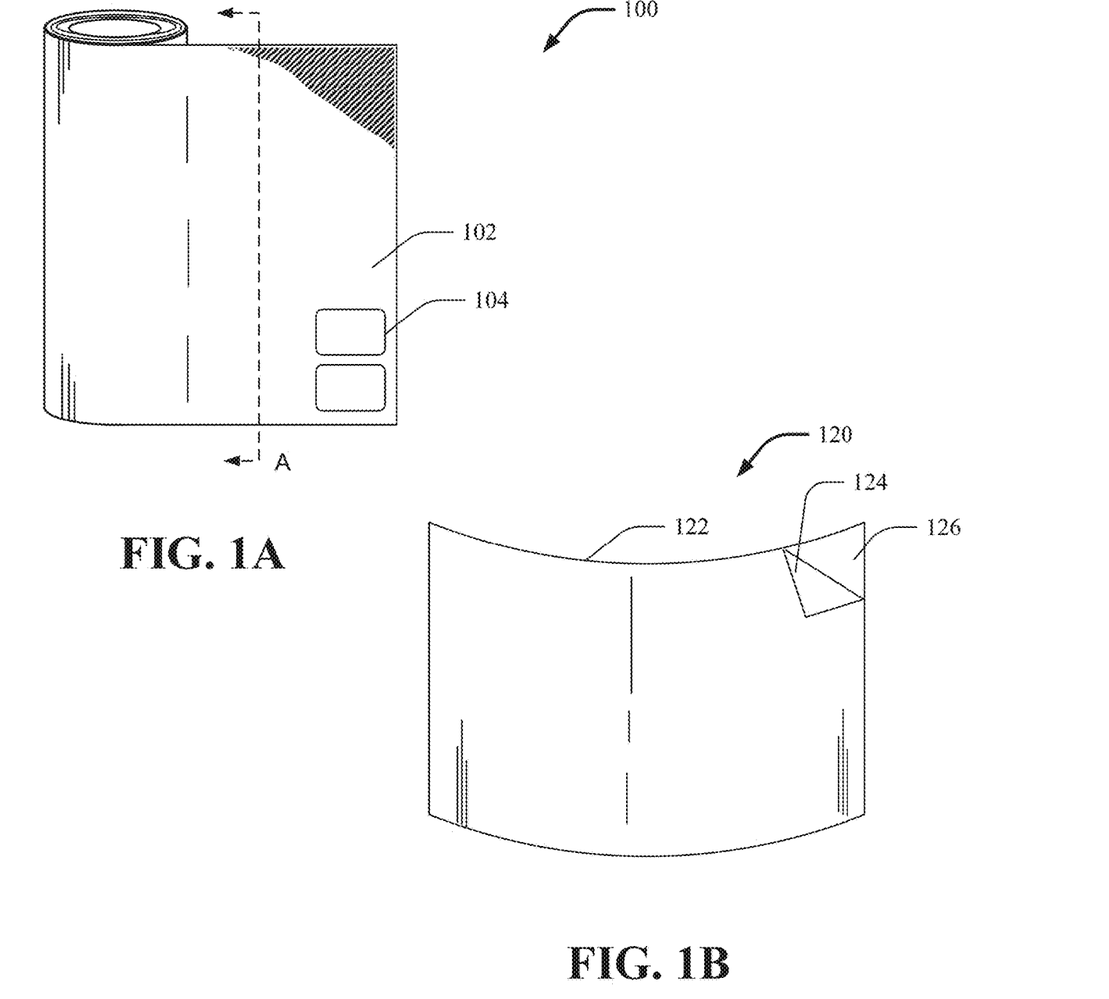
FIG. 1A depicts an example, non-limiting label roll in accordance with one or more embodiments described herein.
FIG. 1B depicts an example, non-limiting a sample label 120 in accordance with one or more embodiments described herein.

FIG. 1A depicts an example, non-limiting label roll 100 in accordance with one or more embodiments described herein. Repetitive description of like elements employed in respective embodiments is omitted for sake of brevity. According to several embodiments, the label roll 100 comprises a label sheet 102 having manufacturer specifications (e.g., width, length, thickness, and materials) is generate. The label sheet can contain graphical patterns or text (not shown) or outlines 104 of a label. In an operation, the label sheet 102 is passed to through die cutting machine, wherein the die cutting machine makes cuts on the label according to a design specification.

FIG. 1B depicts an example, non-limiting a sample label 120 in accordance with one or more embodiments described herein. Repetitive description of like elements employed in respective embodiments is omitted for sake of brevity. According to several embodiments, upon making a die cut using the outlines 104, a label 122 is produced. In an embodiment, the label has a pressure sensitive material 124 that protects graphics or text printed on liner portion 126 of the label 122.

Figure 1C:
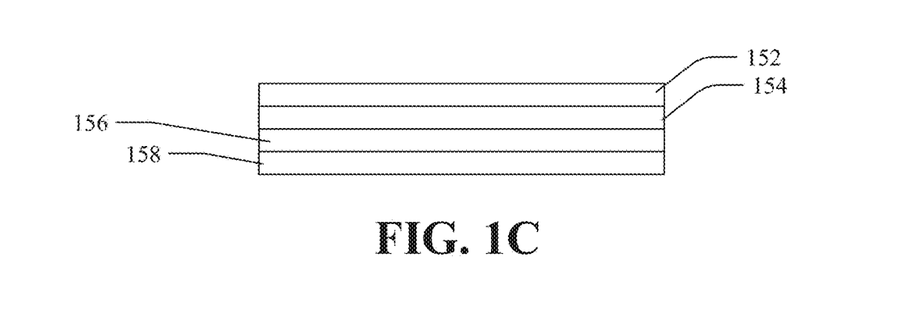
FIG. 1C depicts an example, non-limiting a cross-section view of the label sheet 102 in accordance with one or more embodiments described herein.

FIG. 1C depicts an example, non-limiting a cross-section view of the label sheet 102 in accordance with one or more embodiments described herein. Repetitive description of like elements employed in respective embodiments is omitted for sake of brevity. According to several embodiments, the label sheet 102 is constructed having one or more layers of material. In an embodiment, the label sheet can comprise an adhesive protection sheet 158 that can be peel of prior to attaching to an object, and an adhesive material 156, a liner 154 having pre-printed graphics, images or text and a laminated sheet 152 (e.g., pressure sensitive material or thin plastic sheet). The laminated sheet 152 is attached to the liner using any suitable process and dispersed across the liner 154 to protect the graphics, images or text printed on the liner 154. In an embodiment, the thickness of the liner can be below 0.7 mm. It should be noted that overall thickness of the label may be higher based materials used for the other layers (152, 156 and 158).

Figure 2A:
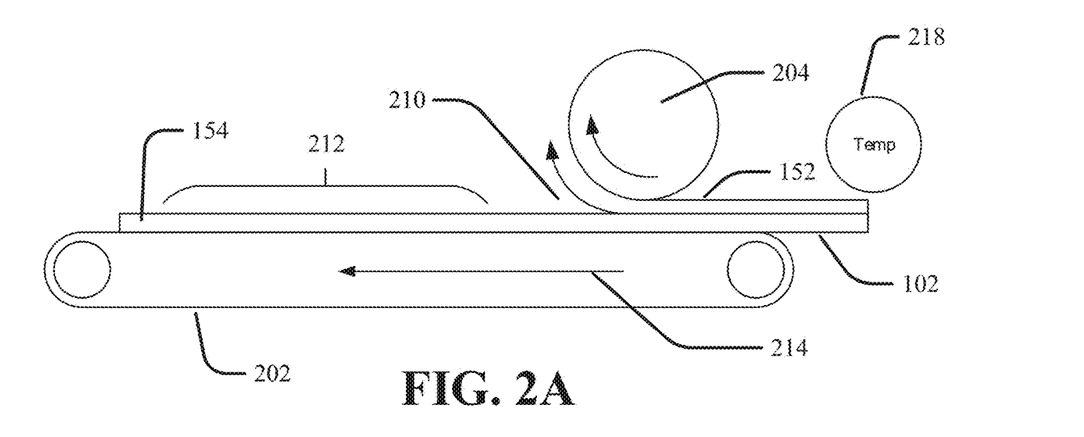
FIG. 2A depicts an example, non-limiting a die cutting unit 200 in accordance with one or more embodiments described herein.

FIG. 2A depicts an example, non-limiting a die cutting unit 200 in accordance with one or more embodiments described herein. Repetitive description of like elements employed in respective embodiments is omitted for sake of brevity. According to several embodiments, the die cutting unit 200 comprises top roller 204 and a conveyer belt 202, constructed to allow for receiving a label sheet 102 for die cutting. In an embodiment, the label sheet 102 is heated prior to inserting the label sheet 102 through the die cutting unit 200. Heating the label sheet 102 allows laminated sheet to easily separate from the liner material. In an embodiment, the label can be heated using a heating-cooling element 218. Heat can be in form of hot air blowing over the laminated sheet 152 as label sheet 102 passes through the die cutting unit 200. In an embodiment, the heating element is heated to a specified temperature to heat the laminated sheet 152. As illustrated, the label sheet is passed between the top roller 204 and the conveyer belt 202. As the label sheet 102 is passes through in first direction 214 (de-lamination), the laminated sheet 152 attaches to the top roller and separates away from the liner 154 at separation point 210. The label sheet is passed through to a die cut area 212. A die cut module (not shown) may be used make die cuts according to specification on the label sheet 102 without any lamination. In an embodiment, the die cuts are made against the surface of the conveyer belt. Making die cuts without laminating sheet decreases stretching.

Figure 2B:
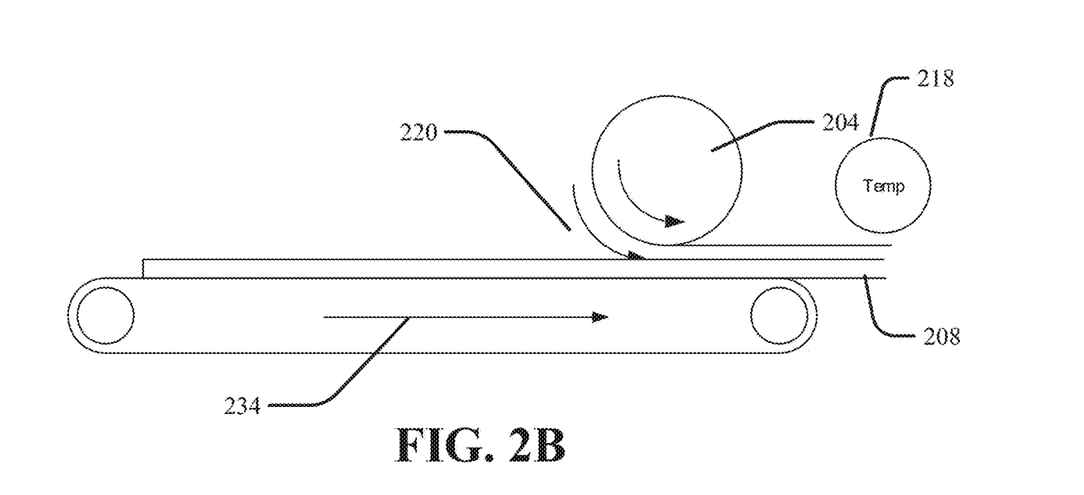
FIG. 2B depicts an example, non-limiting a die cutting unit 200 in accordance with one or more embodiments described herein.

FIG. 2B depicts an example, non-limiting a die cutting unit 200 in accordance with one or more embodiments described herein. Repetitive description of like elements employed in respective embodiments is omitted for sake of brevity. According to several embodiments, upon die cutting the label sheet 102, the die cutting unit 200 may be modified to pass the label sheet 102 through second direction 234 (e.g., re-lamination). At joining point 220, the laminated sheet 152 is attached to the liner 154. In an embodiment, the label can be cooled using the heating-cooling element 218. The cooling can be in a form of cold air blowing over the laminated sheet 152 as the label passes out of the die cutting unit 200. In an embodiment, the heating-cooling element is cooled to a specified temperature to cool the laminated sheet 152.

FIG. 3A-E illustrates a non-limiting example of a die cutting process comprising delamination, die cutting and re-lamination in accordance with one or more embodiments described herein.

Figure 3A:
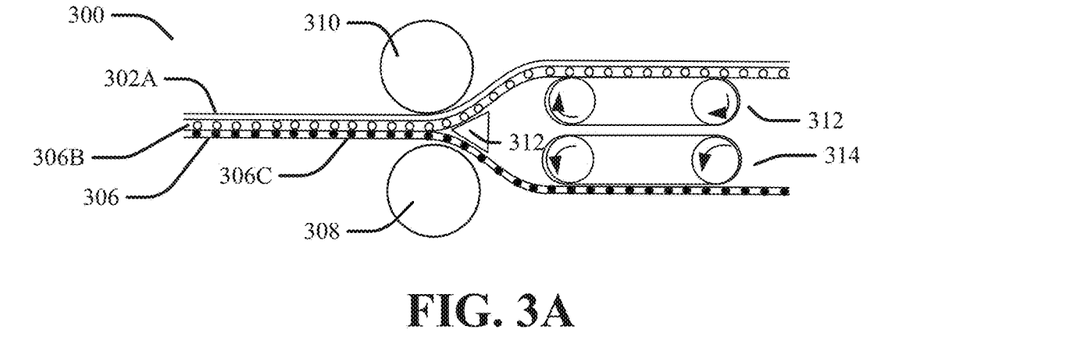
FIG. 3A depicts an example, non-limiting delamination unit 300 in accordance with one or more embodiments described herein.

FIG. 3A depicts an example, non-limiting delamination unit 300 in accordance with one or more embodiments described herein. According to an embodiment, the delamination unit comprises a bottom roller 308 and a top roller 310 that move a label sheet 306. The label sheet 306, according to an embodiment, but not limited to, comprise three layers, a printed face stock layer 306A, an adhesive layer 306B and a liner (e.g., silicon) layer 306C. A separating device 312 is provided that can separate the liner 306C from the other layers (e.g., the printed face stock layer 306A and adhesive layer 306B). Additional rolling units 312 and 314 may be provided to continue moving the separated layers 306A-B and 306C. Various types of equipment may be used to continue moving the separated layers 306A-B and 306C. For example, but not limited to, a conveyer belt 202 may be utilized, one for the printed face stock/adhesive layers 306A-B and one for the liner layer 306C. The conveyer belt 202 may be a single roller or constructed with three or more rollers. A delamination unit (e.g., the bottom roller 308, the top roller 310 and the separating device 312) is utilized to separate the printed face stock layer 306A and adhesive layer 306B from the liner layer 306C.

Figure 3B:
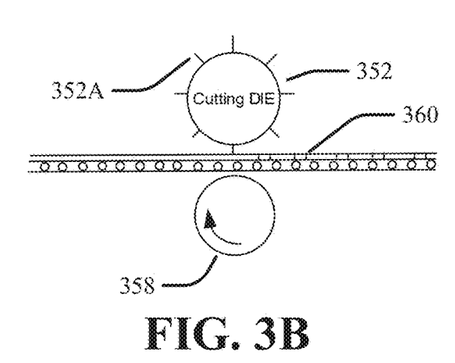
FIG. 3B depicts an example, non-limiting die cut device 350 in accordance with an embodiment described herein.

FIG. 3B depicts an example, non-limiting die cut device 350 in accordance with an embodiment described herein. According to the embodiment, the die cut device 350 comprises cutting device 352 having one or more cutting blades 352A, and anvil roller 358. The anvil roller 358 comprise characteristics that allow the anvil roller 358 to move the adhesive layer 306B without sticking (e.g., comprising similar release characteristics that allow the separation of adhesive layer 306B from the liner layer 306C). The cutting device 352 (also referred to as cutting die) is a rotary die (e.g., engraved or magnetic design) is utilized to make die cuts as the printed face stock/adhesive layers moved by the anvil roller 358. The cutting device is operationally connected to the printed face stock layer 306A and is adjusted (e.g., manually or by a computer controller) based on thickness of the label 306. Base on the preselected design and label characteristics, the cutting device 352 makes one or more cuts 354 into the printed face stock layer 306A.

Figure 3C:
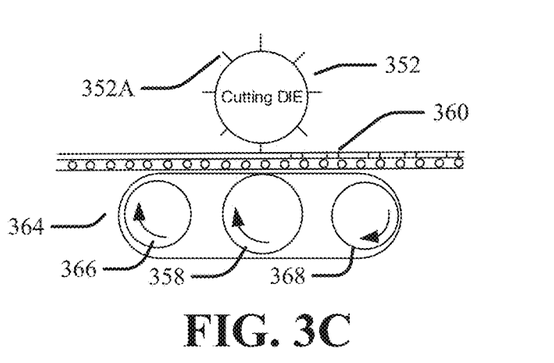
FIG. 3C depicts an example, non-limiting die cut device 360 in accordance with an embodiment described herein.

FIG. 3C depicts an example, non-limiting die cut device 360 in accordance with an embodiment described herein. According to the embodiment, the die cut device 360 comprises cutting device 352 having one or more cutting blades 352A, and rotating belt 364. In some embodiments, the rotating belt rotates over two rollers 366 and 368 that surround an anvil roller 358. The rotating belt comprise characteristics that allow the rotating belt 364 to move the adhesive layer 306B without sticking (e.g., comprising similar release characteristics that allow the separation of adhesive layer 306B from the liner layer 306C). The cutting device 352 (also referred to as cutting die) is a rotary die (e.g., engraved or magnetic design) is utilized to make die cuts as the printed face stock/adhesive layers moved by the rotating belt 364. The cutting device is operationally connected to the printed face stock layer 306A and is adjusted (e.g., manually or by a computer controller) based on thickness of the label 306. Base on the preselected design and label characteristics, the cutting device 352 makes one or more cuts 360 into the printed face stock layer 306A.

Figure 3D:
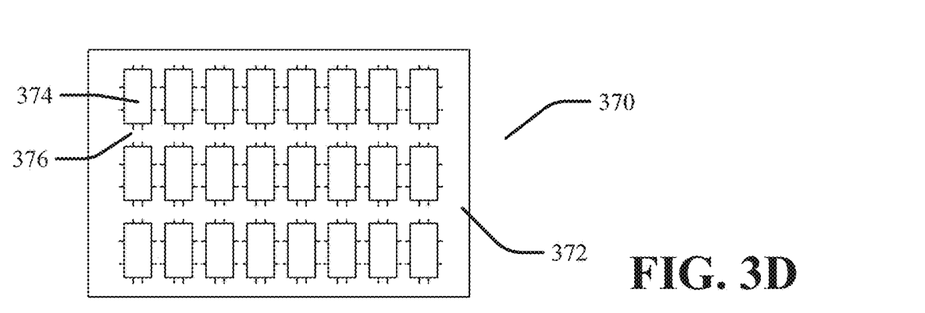
FIG. 3D illustrates a top view of the printed face stock layer after having predetermined die cuts in accordance with an embodiment described herein.

FIG. 3D illustrates a top view of the printed face stock layer 306A after having predetermined die cuts in accordance with an embodiment described herein. As illustrated, the resulting printed face stock layer 306A having one or more predefined label cuts 374 with perforations 376 after having passed through the cutting device 350 or 360. The perforations may hold the pre-die face stock in place until it is re-laminated to the liner layer 306C.

Figure 3E:
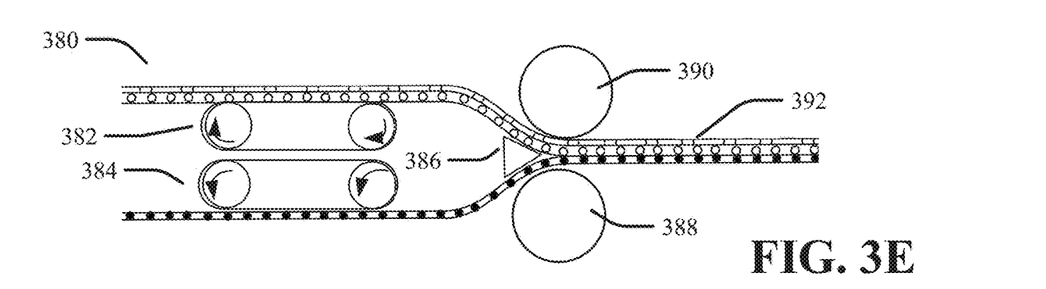
FIG. 3E depicts an example, non-limiting re-lamination unit in accordance with one or more embodiments described herein.

FIG. 3E depicts an example, non-limiting re-lamination unit 380 in accordance with one or more embodiments described herein. According to an embodiment, the re-lamination unit comprises a bottom roller 388, a top roller 390 and a combining guide 386 that combines the printed face stock layer 306A and the adhesive layer 306B to the liner layer 306C. Various designs may be utilized to combine the printed face stock layer 306A and the adhesive layer 306B to the liner layer 306C without deviating from the invention. One or more rolling units may be utilized to transport the separated layers, the printed face stock layer 306A and the adhesive layer 306B layer, and the liner layer 306C, for combination to final label having one or more perforations 392. For example, but not limited to, rolling unit 382 that transports the printed face stock layer 306A and the adhesive layer 306B, and rolling unit 384 that transports the liner layer 306C and rolling unit 384.

Figure 4:
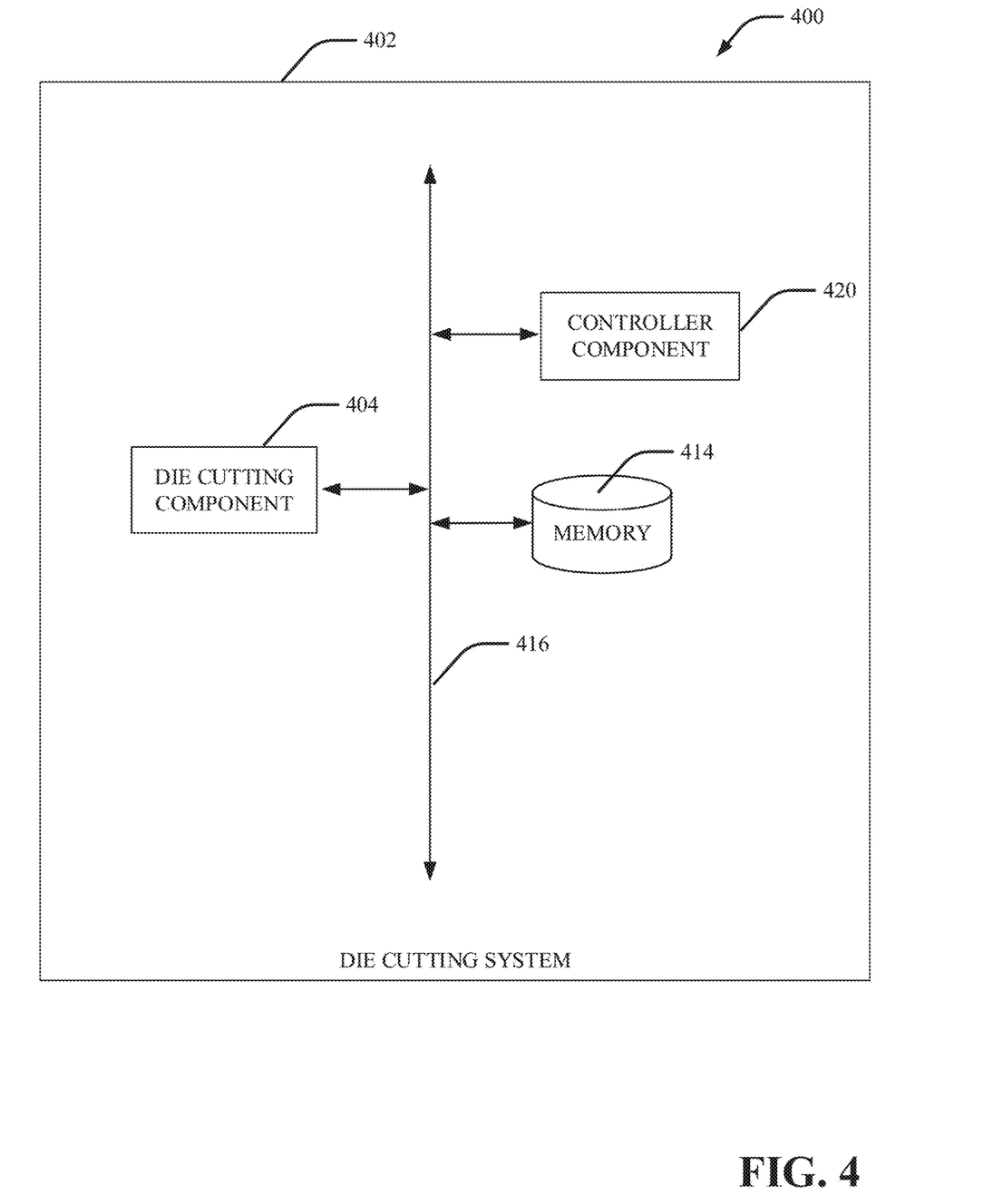
FIG. 4 illustrates a block diagram of an example, non-limiting computer implemented system that facilitates functions of the die cutting system accordance with one or more embodiments described herein.

FIG. 4 illustrates a block diagram of an example, non-limiting computer implemented system 400 that facilitates functions of the die cutting system 402 accordance with one or more embodiments described herein. According to several embodiments, the die cutting system 402 can also include or otherwise be associated with at least one controller component 420 (also referred to as processor) that executes computer executable components stored in memory 414. The die cutting system 402 can further include a system bus 416 that can couple various components including, but not limited to, a die cutting component 404.

Aspects of systems (e.g., system 400 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 400 and the die cutting component 404 can further comprise various computer and/or computing-based elements described herein with reference to operating environment 800 and FIG. 8. In several embodiments, such computer and/or computing-based elements can be used in connection with implementing one or more of the systems, devices, and/or components shown and described in connection with FIG. 4 or other figures disclosed herein.

According to several embodiments, memory 414 can store one or more computer and/or machine readable, writable, and/or executable components and/or instructions that, when executed by controller component 420, can facilitate performance of operations defined by the executable component(s) and/or instruction(s). For example, memory 414 can store computer and/or machine readable, writable, and/ or executable components and/or instructions that, when executed by controller component 420, can facilitate execution of the various functions described herein relating to the die cutting component 404. In an embodiment, the controller component 420 controls heating-cooling element. The controller component can heat the label sheet 102 in preparation for separating the laminated sheet 152 from liner 154. The controller component can cool the label sheet 102 after the laminated sheet and liner 154 have been reattached.

In several embodiments, memory 414 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 414 are described below with reference to system memory 816 and FIG. 8. Such examples of memory 414 can be employed to implement any embodiments of the subject disclosure.

According to some embodiments, controller component 420 can comprise one or more types of processors and/or electronic circuitry that can implement one or more computer and/or machine readable, writable, and/or executable components and/or instructions that can be stored on memory 414. For example, controller component 420 can perform various operations that can be specified by such computer and/or machine readable, writable, and/or executable components and/or instructions including, but not limited to, logic, control, input/output (I/O), arithmetic, and/or the like. In some embodiments, controller component 420 can comprise one or more central processing unit, multi-core processor, microprocessor, dual microprocessors, microcontroller, System on a Chip (SOC), array processor, vector processor, and/or another type of processor.

In some embodiments, controller component 420, memory 414, die cutting component 404 can be communicatively, electrically, and/or operatively coupled to one another via a bus 416 to perform functions of system 400, and/or any components coupled therewith. In several embodiments, bus 416 can comprise one or more memory bus, memory controller, peripheral bus, external bus, local bus, and/or another type of bus that can employ various bus architectures. Further examples of bus 416 are described below with reference to system bus 818 and FIG. 8. Such examples of bus 416 can be employed to implement any embodiments of the subject disclosure.

In several embodiments, die cutting system 402 can comprise one or more computer and/or machine readable, writable, and/or executable components and/or instructions that, when executed by controller component 420, can facilitate performance of operations defined by such component(s) and/or instruction(s). Further, in numerous embodiments, any component associated with die cutting system 402, as described herein with or without reference to the various figures of the subject disclosure, can comprise one or more computer and/or machine readable, writable, and/or executable components and/or instructions that, when executed by controller component 420, can facilitate performance of operations defined by such component(s) and/or instruction(s). For example, die cutting component 404, and/or any other components associated with die cutting system 402 (e.g., communicatively, electronically, and/or operatively coupled with and/or employed by die cutting system 402), can comprise such computer and/or machine readable, writable, and/or executable component(s) and/or instruction(s). Consequently, according to numerous embodiments, die cutting system 402 and/or any components associated therewith, can employ controller component 420 to execute such computer and/or machine readable, writable, and/or executable component(s) and/or instruction(s) to facilitate performance of one or more operations described herein with reference to die cutting system 402 and/or any such components associated therewith.

In some embodiments, the die cutting component 404 can comprise, but is not limited to, a conveyer belt, a top roller, a heating-cooling element and a die cutting module. The die cutting component 404 can perform the functions of heating the label sheet 102 to a specified temperature, separating the laminated sheet from the liner, die cutting patterns on the liner and re-laminating the label sheet 102. In several embodiments, the die cutting component 404 can be electrically, and/or operatively coupled to one or more sensors (not shown) associated with various components of die cutting system 402 to make accurate die cuts.

Figure 5:
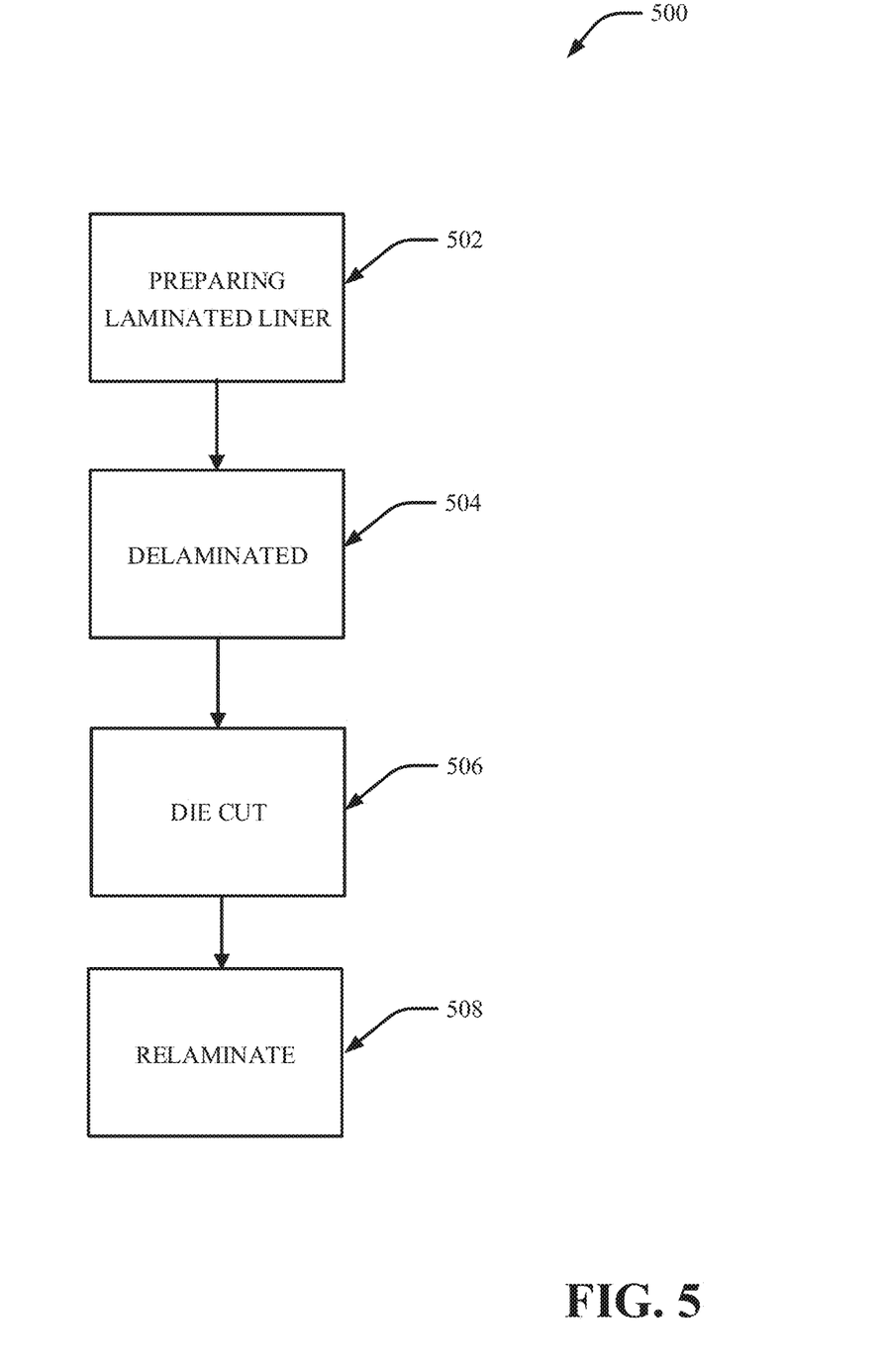
FIG. 5 depicts a diagram of an example, non-limiting computer implemented method that facilitates die cutting labels accordance with one or more embodiments describe herein.

FIG. 5 depicts a diagram of an example, non-limiting computer implemented method that facilitates die cutting labels accordance with one or more embodiments describe herein. Repetitive description of like elements employed in other embodiments described herein is omitted for sake of brevity. In some examples, flow diagram 500 can be implemented by operating environment 800. It can be appreciated that the operations of flow diagram 500 can be implemented in a different order than is depicted.

In non-limiting example embodiments, a computing device (or system) (e.g., computer 812) is provided, the device or system comprising one or more processors and one or more memories that stores executable instructions that, when executed by the one or more processors, can facilitate performance of the operations as described herein, including the non-limiting methods as illustrated in the flow diagrams of FIG. 5. As a non-limiting example, the one or more processors can facilitate performance of the methods by directing or controlling one or more equipment operable to perform semiconductor fabrication.

Operation 502 depicts preparing, by a die cutting unit, the label sheet 102. In an embodiment, temperature is adjusted to allow the separation of the label sheet layers. The amount of temperature adjustment (e.g., increasing heat or cooling) is based use of heat or cooling and thickness and type of lamination used for constructing the laminated sheet 152. Operation 504 depicts delaminating, by the die cutting unit, the label sheet 102 by separating the laminated sheet away from the liner 154. In an embodiment, the label sheet 102 is passed through the die cutting unit, wherein the laminated sheet attaches to a top roller 204 as the label sheet 102 is passed on the conveyer belt 202. Operation 506 depicts die cutting, by the die cutting unit, the label sheet 102. Once the lamination is removed, the die cuts can be made without stretching the liner. Operation 508 depicts re-laminating, by the die cutting unit, the label sheet 102. After die cuts are made, the die cut reverses the process and attaches the detached lamination back on the label sheet 102.

Figure 6:
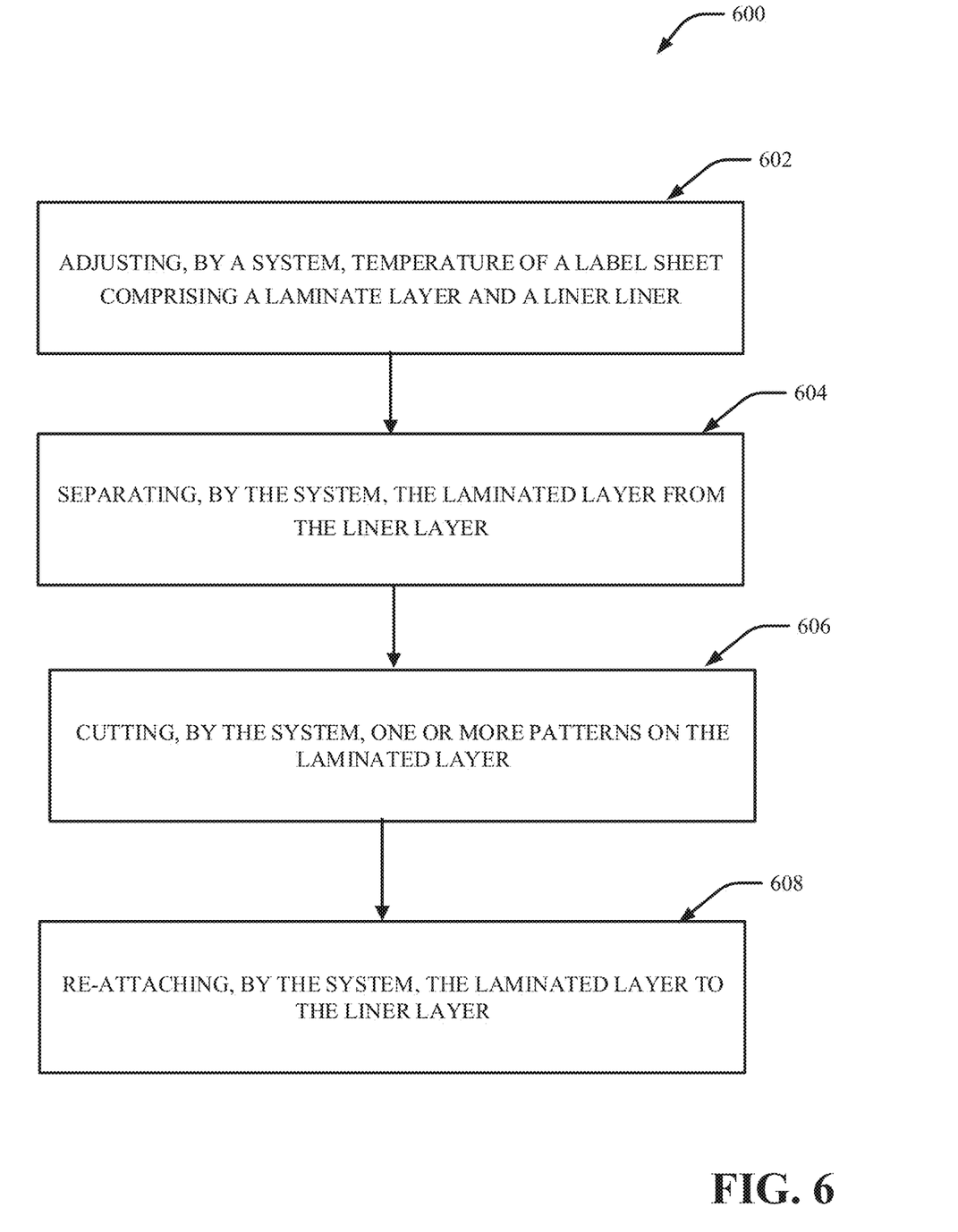
FIG. 6 depicts a diagram of an example, non-limiting computer implemented method that facilitates die cutting labels accordance with one or more embodiments describe herein.

FIG. 6 depicts a diagram of an example, non-limiting computer implemented method that facilitates die cutting labels accordance with one or more embodiments describe herein. Repetitive description of like elements employed in other embodiments described herein is omitted for sake of brevity. In some examples, flow diagram 600 can be implemented by operating environment 800. It can be appreciated that the operations of flow diagram 600 can be implemented in a different order than is depicted.

In non-limiting example embodiments, a computing device (or system) (e.g., computer 812) is provided, the device or system comprising one or more processors and one or more memories that stores executable instructions that, when executed by the one or more processors, can facilitate performance of the operations as described herein, including the non-limiting methods as illustrated in the flow diagrams of FIG. 6. As a non-limiting example, the one or more processors can facilitate performance of the methods by directing or controlling one or more equipment operable to perform semiconductor fabrication.

Operation 602 depicts adjusting, by a system, temperature of a label sheet comprising a laminated layer and a liner layer (e.g., increasing or decreasing the temperature of label sheet to prepare for separating the laminate layer from the liner layer). In an embodiment, heat is applied to prepare the label sheet. Operation 604 depicts separating, by the system, the laminated layer from the liner layer. Operation 606 depicts cutting, by the system, one or more patterns on the laminated layer. Operation 608 depicts re-attaching, by the system, the laminated layer to the liner layer.

Figure 7:
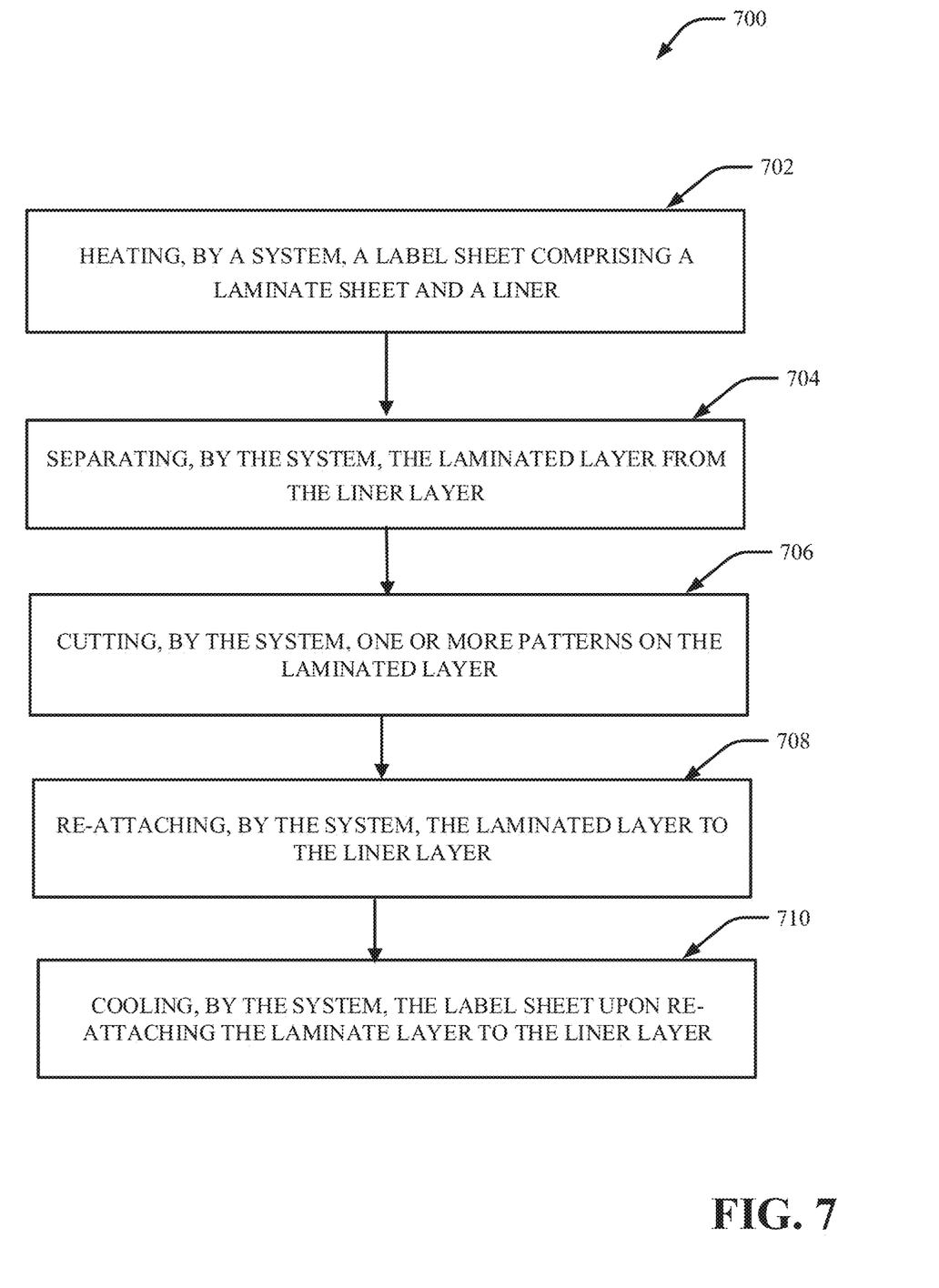
FIG. 7 depicts a diagram of an example, non-limiting computer implemented method that facilitates die cutting labels accordance with one or more embodiments describe herein.

FIG. 7 depicts a diagram of an example, non-limiting computer implemented method that facilitates die cutting labels accordance with one or more embodiments describe herein. Repetitive description of like elements employed in other embodiments described herein is omitted for sake of brevity. In some examples, flow diagram 700 can be implemented by operating environment 800. It can be appreciated that the operations of flow diagram 700 can be implemented in a different order than is depicted.

In non-limiting example embodiments, a computing device (or system) (e.g., computer 812) is provided, the device or system comprising one or more processors and one or more memories that stores executable instructions that, when executed by the one or more processors, can facilitate performance of the operations as described herein, including the non-limiting methods as illustrated in the flow diagrams of FIG. 7. As a non-limiting example, the one or more processors can facilitate performance of the methods by directing or controlling one or more equipment operable to perform semiconductor fabrication.

Operation 702 depicts adjusting, by a system, temperature of a label sheet comprising a laminated layer and a liner layer. Operation 704 depicts separating, by the system, the laminated layer from the liner layer. Operation 706 depicts cutting, by the system, one or more patterns on the laminated layer. Operation 708 depicts re-attaching, by the system, the laminated layer to the liner layer. Operation 710 depicts cooling, by the system, the label sheet upon re-attaching the laminated layer to the liner layer.

Figure 8:
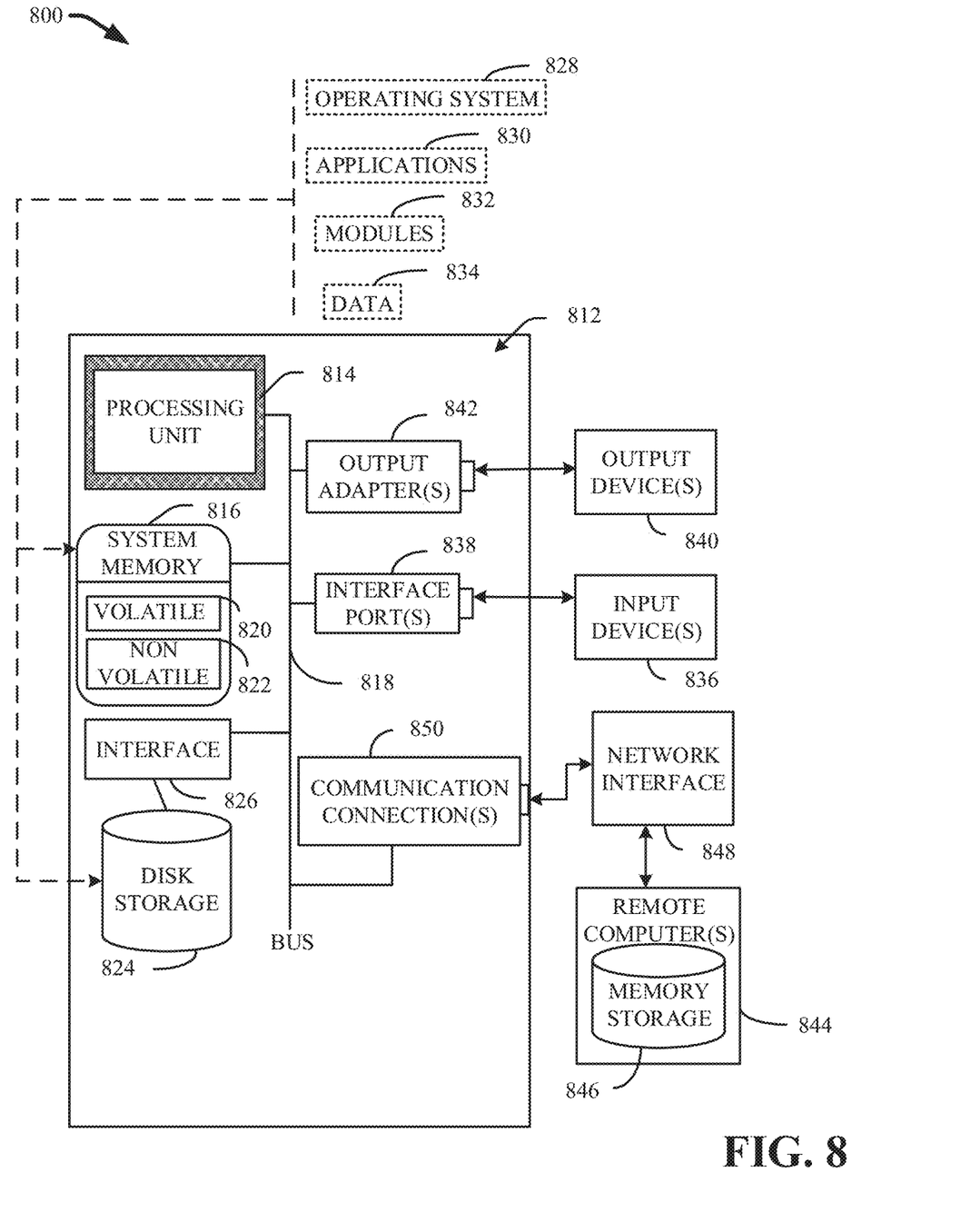
FIG. 8 illustrates a block diagram of an example, non-limiting operating environment in which one or more embodiments described herein can be facilitated.

To provide context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

A suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 894), and Small Computer Systems Interface (SCSI). The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 8 also depicts software that acts as an intermediary between users and the basic computer resources described in the suitable operating environment 801. Such software can also include, for example, an operating system 828. Operating system 828, which can be stored on disk storage 824, acts to control and allocate resources of the computer 812. System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Embodiments of the present innovation may be a system, a method, an apparatus and/or a computer program product at any possible technical detail level of integration. The computer program product can include a computer readable storage medium (or media) having computer readable program instructions thereon for causing a processor to carry out aspects of the present innovation. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present innovation can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present innovation.

Aspects of the present innovation are described herein with reference to flowchart illustrations and/or block diagrams of methods, apparatus (systems), and computer program products according to embodiments of the innovation. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present innovation. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform tasks and/or implement abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:
   adjusting, by a system, using a heater, a temperature of a label sheet comprising a laminated layer and a liner layer;
   separating, by the system, the laminated layer from the liner layer;
   cutting, by the system, one or more patterns on the laminated layer; and
   re-attaching, by the system, the laminated layer to the liner layer.

2. The computer implemented method of claim 1, further comprising:
   cooling, by the system, using a cooler, the label sheet upon re-attaching the laminated layer to the liner layer.

3. The computer implemented method of claim 2, wherein the cooling the label sheet comprises cooling an element to a pre-defined temperature level.

4. The computer implemented method of claim 1, wherein separating the laminated layer from the liner layer comprises utilizing a delamination unit.

5. The computer implemented method of claim 1, wherein re-attaching the laminated layer having the patterns to the liner layer comprises utilizing re-lamination unit.

6. The computer implemented method of claim 1, wherein the adjusting the temperature of the label sheet comprises heating an element to a pre-defined temperature level.

7. The computer implemented method of claim 1, wherein cutting the one or more patterns on the label sheet comprises die cutting the label sheet against a surface of a conveyer belt.

* * * * *